United States Patent [19]
Driggs

[11] 3,764,714
[45] Oct. 9, 1973

[54] METHOD OF PEELING EGGS
[75] Inventor: Leslie W. Driggs, West Sand Lake, N.Y.
[73] Assignee: Nutronics Machine Corporation, Hoosick Falls, N.Y.
[22] Filed: July 15, 1970
[21] Appl. No.: 54,969

[52] U.S. Cl. .................. 426/234, 426/243, 426/299
[51] Int. Cl. ............................................ A23l 1/32
[58] Field of Search ............................. 99/113, 217

[56] References Cited
UNITED STATES PATENTS

| | | | |
|---|---|---|---|
| 3,272,636 | 9/1966 | Fehr et al. | 99/214 |
| 3,216,828 | 11/1965 | Koonz et al. | 99/113 |
| 2,550,189 | 4/1951 | Droege et al. | 99/113 |
| 2,545,308 | 3/1951 | Ritchie | 99/440 |

OTHER PUBLICATIONS

"The Gourmet Cookbook," 1953, pp. 123, Gourmet Distributing Corp. 768 Fifth Ave. N.Y., N.Y.

Primary Examiner—A. Louis Monacell
Assistant Examiner—Robert M. Elliott
Attorney—Cushman, Darby and Cushman

[57] ABSTRACT

A method of peeling eggs whereby the eggs are cooked small end down, cooled rapidly and peeled by placing them in a cylindrical chamber having its central axis generally disposed at an angle to the vertical. The chamber is moved in an orbital movement without rotating the chamber about its central axis. The peeled eggs are then packaged and pasteurized. The pasteurization may be carried out with radio frequency heating at approximately 180°F.

14 Claims, 6 Drawing Figures

METHOD OF PEELING EGGS

BACKGROUND AND BRIEF DESCRIPTION OF INVENTION

This invention relates to improved methods and apparatus for treating poultry eggs so that such eggs can be made more readily available for consumer usage. More specifically, the invention provides for novel cooking and peeling of eggs that substantially eliminate hand labor and other problems that have been associated with egg handling and storage in the past. In this specification and its claims, reference will be made to "hard cooked" eggs and "peeling" of eggs. The phrase hard cooked is intended to describe what is more commonly known as a hard boiled condition for an egg wherein the yolk and white are firm and non-liquid. The term peeling is intended to describe the removal of the shell from the egg.

In recent years there has been an overall decline in per capita egg consumption in the United States. In addition, the use of hard cooked eggs has become less attractive to the food service industries, mainly because of problems involved in handling, storing, and preparing such eggs for ultimate use and consumption. At the present time, hard cooked eggs are still peeled by hand, and this represents an inefficient and inconvenient treatment requirement that discourages the use of such eggs in large quantities by food service industries. Also, eggs themselves have changed through the years as geneticists have bred poultry for improved egg quality and higher egg production. For example, it is known that eggs of higher quality have a lower pH for their whites and shell membranes than do eggs of lower quality and that such higher quality eggs are more difficult to peel. Conversely, it has been recognized that lower quality eggs have a higher pH and are easier to peel. Certain prior art efforts in the art of egg peeling have concentrated on adjusting the pH of eggs to facilitate peeling, but these efforts have not fully satisfied the need for hard cooked eggs that are easy to peel. In addition, breeding practices have inadvertently resulted in a change in chaleza structures in eggs. It has been found that the chaleza structures at the larger ends of eggs are now considerably smaller or weaker than those of eggs from earlier strains of birds, and this weakness permits greater yolk movement in certain directions within the shell. As a result, the present day practice of cooking eggs while they are lying on their sides, or positioned with their small ends directed upwardly, produces a high percentage of eggs which have yolks that are considerably off center and even almost protruding through the white of the egg, thereby making for even more difficult peeling and very poor appearance of the final product.

The present invention is directed to improvements im methods and apparatus for treating eggs so that eggs can be hard cooked, peeled, and stored more economically and more efficiently. Various parts of the overall invention will be discussed under separate headings below:

a. Cooking:

It has been discovered that eggs can be more readily peeled if the yolk position within a cooked egg is away from the egg shell so that a layer of egg white completely surrounds the yolk. This positioning of the yolk is essential because the white part of the egg can be more readily separated from the membrane which lines the egg shell, without damaging the egg, when the yolk is surrounded by a more or less constant thickness of egg white. In the peeling of an egg, both the shell and its attached membrane are removed from the egg white. Along with this discovery, it has been found the yolk position in a cooked egg can be controlled by cooking the eggs with their smaller ends directed downwardly. This orientation of the eggs during the cooking process results in a better centralized positioning of the yolks in the eggs. As mentioned above, the chaleza structures at larger ends of eggs are becoming smaller and weaker, and it has been found that if such eggs are positioned, in accordance with past practices, with their larger ends pointed downwardly, the yolks have a tendency to float up through the egg whites until they are considerably off center. On the other hand, a positioning of an egg with its smaller end down results in a holding of the yolk in place by the stronger chaleza at the smaller end of the egg.

In the practice of the present invention, eggs are loaded onto trays with their small ends directed downwardly, and the trays are moved into a cooking zone where the eggs are hard cooked by hot water, steam, super-heated steam, or other heated fluid. Cooking is continued until the eggs are hard cooked according to known and accepted standards.

b. Peeling:

As mentioned above, it has been known that the pH of an egg is an important factor with respect to the ease with which the egg can be peeled. Aged eggs have a higher pH and are easier to peel even though they are of a lower quality than fresh eggs having lower pH values. U.S. Pat. No. 3,216,828 recognizes the advantages of artificial aging to raise the pH of an egg. This is done with pre-conditioning steps which involve the use of chemical absorbers or artificial heating to about 100° F.

In contrast to such prior art attempts, the prevent invention provides both a method and apparatus for peeling eggs which are fresh and of a low pH. Such eggs may be subjected to pre-conditioning treatments if desired, but such treatments are not necessary when the invention is followed. In accordance with this invention, eggs can be peeled very rapidly (for example in about 3 seconds per egg) by a mechanical device which does not require any hand operations to effect peeling. This is done by subjecting each egg to surface cooling and then to a rapid flexing of the egg shell, its membrane, and the egg white. It has been discovered that pre-conditioning of an egg by cooling before peeling is of greater importance to ease of peeling than is an adjustment of pH. Also, it has been found that mechanical flexing of all surfaces of an egg results in a quick separation of a shell from the egg. Flexing of the surfaces of each egg is accomplished by subjecting the egg to mechanical forces resulting from rapid movements of the egg against the inside walls of a chamber while the chamber is being orbited about an axis without being rotated within its own axis. This results in a flexing which takes place so rapidly that the bond between the egg shell membrane and the egg white is quickly broken without disrupting the integrity of the egg white and its contained yolk.

A type of limited flexing of a portion of an egg shell is described in U.S. Pat. No. 2,713,881, but this type of flexing or cracking of a shell is not comparable to the flexing operation of the present invention. Basically, the procedure outlined in U.S. Pat. No. 2,713,881 is one of cracking a center section of a shell so that it can attach itself to an adhesive tape and be removed from the egg white, thereby leaving two cup-like portions behind for easy removal. In contrast, the procedure of the present invention is completely mechanical in nature and operates to break a bond within the egg itself so that the shell is virtually thrown off from the egg white by the rapid moving and flexing of the entire egg. Apparatus for carrying out the peeling operation includes a chamber which is cylindrical in form and which has an open top into which an egg can be placed for peeling. The chamber is tilted and orbited about an axis in such a way that the egg is subjected to violent and rapid changes in movement. The chamber is mounted within a frame which can be pivoted to a discharge position for discharging the peeled egg and its separated shell at the end of each peeling cycle. The apparatus is provided with a mechanism for allowing the chamber to be pivoted downwardly and cleaned after each egg is peeled.

c. Subsequent Treatments, Including Packaging:

Since the processing steps described above can be carried out as parts of a continuous process, a final treatment step can involve a packaging of the egg product which has been obtained by cooking and peeling the eggs. The packaging step utilizes known techniques for placing the hard cooked and peeled eggs in individual packages for storing and ultimate sale and use. An example of such a known technique involves a placing of a number of eggs in a plastic bag which can be evacuated of air and heat sealed. If desired, an inert gas can be used to replace the air in each package. A further part of the present invention provides for a re-heating of the eggs after they are peeled so as to pasteurize them and to prepare them for packaging and a long shelf life. This re-heating step may take place either prior to packaging or after the eggs are placed in a package. Re-heating is carried out at about 180° F to provide good bacteriological control of the egg product. A preferred re-heating treatment involves the use of radio frequency energy (50 to 100 megahertz) to create sufficient heat to effect pasteurization. Preferably this is done after packaging so that there will be no further contamination of the egg product after it is pasteurized. Radio frequency pasteurization also offers an additional benefit of reducing the green coloration of the white portion of a hard cooked egg (as commonly seen around the yolk area of the egg). The mechanism by which the coloration is reduced or removed by radio frequency heating is not known but this highly desirable result has been observed by testing. Also, radio frequency heating is desirable because the white portion of the egg is more sensitive to this type of re-heating than is the egg yolk.

Thus, in accordance with a preferred processing of eggs by the present invention, the centers of the eggs are maintained at as high a temperature as possible during peeling so that re-heating can be acomplishing very quickly and with lower amounts of energy. It is preferred that surfaces of the cooked eggs be flash cooled to a relatively low temperature prior to peeling so that peeling will be facilitated by the reduction in temperature of surface areas of the cooked eggs. Flash cooling, as by immersion in cold water, leaves the yolk centers of the eggs at relatively higher temperatures, and this allows a rapid re-heating and pasteurization after peeling.

These and other features and advantages of the present invention will become apparent in the more detailed discussion which follows. In that discussion reference will be made to the accompanying drawings as briefly described below.

DETAILED DESCRIPTION OF INVENTION

Referring to the drawings, the invention is illustrated in terms of methods and apparatus for treating poultry eggs. The following discussion will make reference to specific methods and specific apparatus suitable for practicing the invention, but it is to be understood that the specific examples which are given represent only several of many possible ways in which the basic principles of the invention can be practiced.

Figure 1:
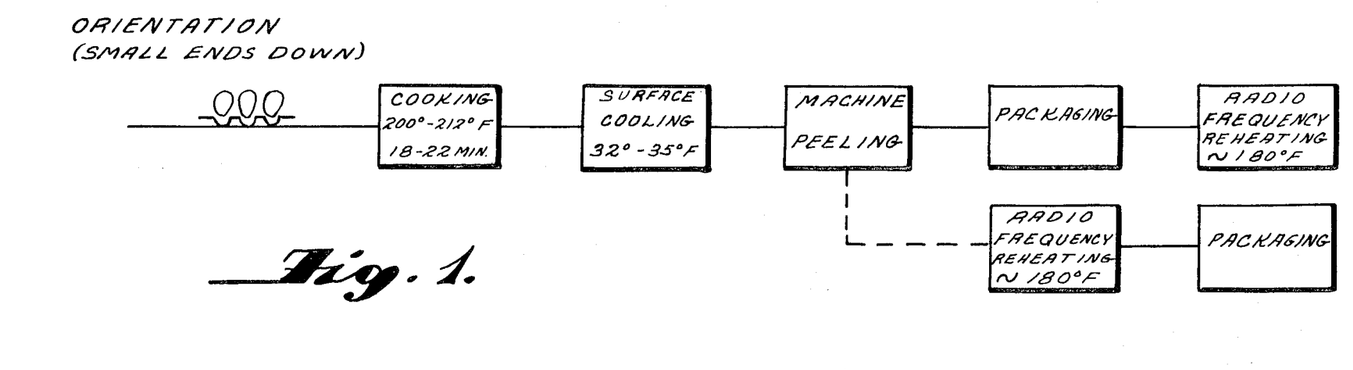
FIG. 1 is a schematic flow diagram showing a complete egg treating method for cooking, peeling, and packaging pasteurized eggs in accordance with the present invention.
Figure 2A:
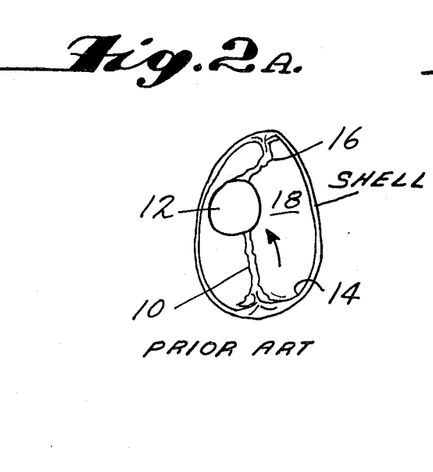
FIG. 2a and FIG. 2b are sectional views of typical chicken eggs when oriented with a larger end directed downwardly or with the egg positioned on its side, in accordance with prior art practices.
Figures 2B, 3:
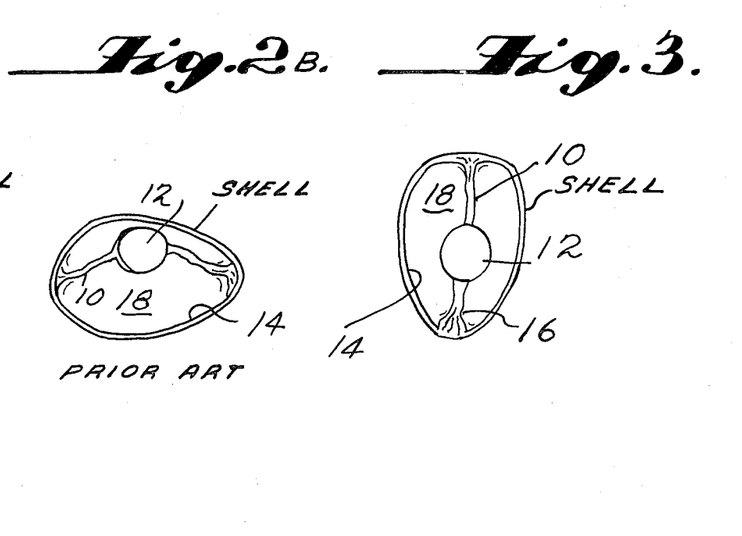
FIG. 3 is a view of the type of egg shown in FIG. 2, but with its smaller end directed downwardly.

FIGS. 1 – 3 illustrate basic concepts involved in the hard cooking of eggs in accordance with this invention. It is important that eggs be properly oriented with their small ends directed downwardly during the cooking operation so that a preferred positioning of yolks near the centers of the eggs will be achieved. As discussed above, and as illustrated in FIGS. 2 and 3, the chaleza structure 10 at the large end of a present day egg is greatly weakened or reduced in size due to breeding changes that have been directed to improving and increasing egg yields. The chaleza structure 10 functions to anchor a yolk 12 relative to the larger end of a typical egg configuration. An additional chaleza structure 16 serves a similar function for anchoring a yolk relative to the smaller end of each typical egg. FIG. 2 illustrates an orientation of an egg with its larger end directed downwardly for purposes of cooking the egg in accordance with known prior art practices (see for example U.S. Pat. No. 2,575,608). Because of the weakened characteristics of the chaleza structure 10, its anchoring function is greatly reduced and the fatty yolk 12 tends to float upwardly through the liquid white part of the egg until it is dislodged away from a centered position in the egg. The same type of dislodgement occurs if eggs are placed on their sides, and either way, there is a tendency for the yolk to approach and nearly touch the inner membrane of the shell. Such a dislodged positioning of a yolk in a cooked egg makes the egg more difficult to peel because there is a greater chance of breaking through a thin layer of cooked egg white, in the area of the yolk, and breaking up the integrity of the whole egg.

FIG. 3 illustrates one of the discoveries of the present invention with respect to improved orientation of eggs for cooking and peeling purposes. It has been found that a positioning of eggs with their smaller ends directed downwardly results in a very good centering of the yolk, and further, it has been found that such centering in a cooked egg is very important to successful mechanical peeling of the egg. The chaleza structure 16 which anchors the yolk to the small end of the egg is stronger than the opposite chaleza 10, and thus, the yolk is held suspended in a centered position by the chaleza 16 without any dislodgment of the yolk.

Referring back to FIG. 1, an overall process for cooking, peeling and packaging eggs is shown. A first step in the process involves orienting of eggs on racks or trays with their small ends directed downwardly, as discussed above with reference to FIG. 3. Then, the racks or trays are moved by known conveying means into a cooking zone where they are subjected to high temperature cooking for a sufficient time to produce a high quality hard cooked egg. The cooking is carried out in known equipment in which the eggs are heated by high temperature water, steam, super-heated steam or other heated liquid or gas. As an example of a typical cooking operation, the eggs may be cooked in a chamber in heated water at a temperature in the range of 200° – 212° F for a period of 18 – 22 minutes. The eggs may be moved through the cooking zone while being cooked, or they may be stopped in the cooking zone until cooking is completed and then moved out by a conveying device. Preferably they are maintained on racks or trays in their previously oriented positions during the entire cooking operation so that their yolks will remain centered until cooking is completed.

From the cooking zone, the eggs are moved to a cooling zone where at least the surfaces of the eggs are rapidly cooled to a low temperature to facilitate machine peeling of the eggs. Although it is a common practice to chill eggs after cooking, it has been found, in accordance with this invention, that two critical factors in the chilling step can materially aid and increase the efficiency of the peeling operation. Firstly, it has been found that the degree of chilling is important because it is possible to shock the inner shell membrane and to loosen the membrane for easier peeling if low chilling temperatures are observed. According to this invention, the cooked eggs should be subjected to temperatures at least as low as 32° – 35° F. Secondly, it has been found that the temperature of a cooked egg white at the time of peeling is even more important to successful peeling than is the quality of the egg white. The colder the white, the firmer is its consistency, and this makes it easier to peel the egg with less chance of damage to the egg.

The flow diagram of FIG. 1 indicates surface cooling of the hard cooked eggs for a continuous process in which there will be subsequent re-heating and pasteurization of the egg product after peeling. The purpose in this is to maintain the center portions of the eggs at as high a temperature as possible so as to facilitate subsequent re-heating, while, at the same time, reducing surface temperatures to a sufficient level to substantially improve peeling characteristics. Thus, the step of chilling only the surfaces of eggs in a continuous process offers an advantage in bacteriological control and in subsequent pasteurization of the eggs. However, if the hard cooked eggs are not to be immediately peeled, the entire egg may be allowed to cool if desired. Surface cooling of the eggs in a continuous process can be accomplished by known devices for effecting a rapid cooling of the eggs. For example, the eggs may be conveyed from the cooking zone into a cold water bath which is maintained at a temperature within the range of 32° to 35° F for effecting rapid surface cooling of the cooked eggs. Then, the cooled eggs may be moved from the water bath to a peeling station where the shells are removed by a mechanical treatment which will be discussed in greater detail below.

After peeling, the eggs may be pasteurized and packaged in accordance with either of the sequences illustrated in FIG. 1. Preferably, the peeled eggs are placed in packages, such as thermoplastic bags which can be heat sealed and evacuated, and then pasteurized within the packages. Pasteurization comprises a re-heating of the eggs to approximately 180° F and this can be done with hot water, a heated gas, or in any other known way. With this type of treatment, shelf life for the final product is considerably improved, and the egg product may be stored for a number of weeks with normal refrigeration but without freezing. In addition, it has been found that the use of radio frequency energy (for example in the range of 50 to 100 megahertz) for re-heating and pasteurizing eggs results in greatly extended shelf life of up to thirteen weeks with normal refrigeration. Radio frequency heating is especially good for re-heating eggs in accordance with the continuous process illustrated in FIG. 1 because the egg white is more sensitive to radio frequency energy than is the egg yolk. Thus, the cooler white near the surface area of the egg is heated more rapidly, but this is a preferred sensitivity because the yolk is already heated to a certain extent from the cooking part of the process. Quite unexpectedly, it has been found that radio frequency heating of eggs has an additional benefit of reducing or even removing the green coloration which is commonly seen as a green ring around the yolk of a cooked egg. Thus, radio frequency heating produces a more desirable appearance for the final egg product, and radio frequency energy may be used to treat hard cooked eggs which have been chopped, sliced or deviled, if desired. Preferably, radio frequency heating is maintained for a sufficient time to bring internal and external temperatures of the eggs to approximately 180° F. This can be accomplished very quickly, especially where the internal portions of the eggs have been maintained at relatively high temperatures (70° to 100° F) during the previous steps of surface cooling and machine peeling.

Figure 4:
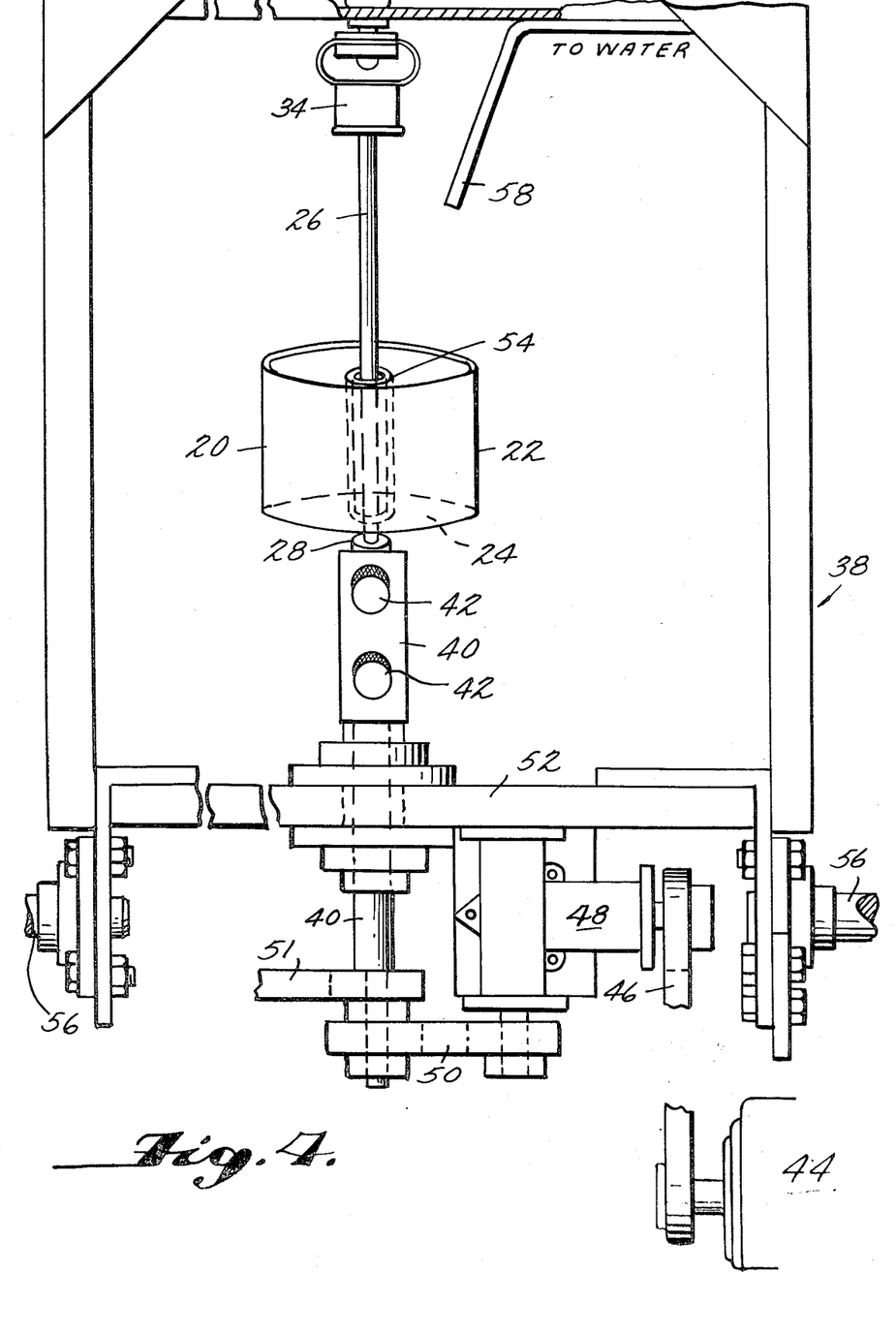
FIG. 4 is a front elevational view of a form of apparatus of this invention for mechanically peeling hard cooked eggs.
Figure 5:
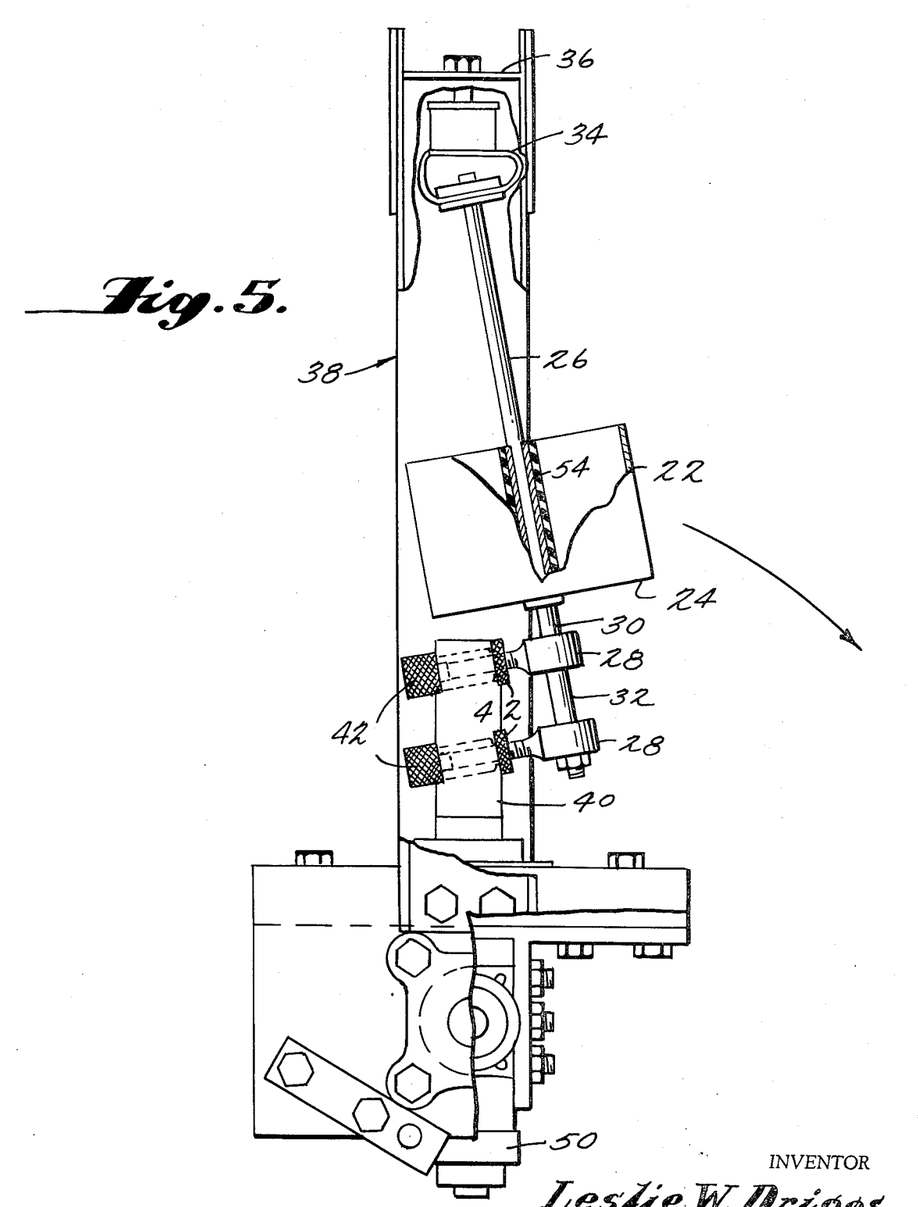
FIG. 5 is a side elevational view of the same apparatus as is shown in FIG. 4.

FIGS. 4 and 5 illustrate an embodiment of apparatus useful for rapidly peeling eggs in accordance with the present invention. The type of apparatus which is illustrated may be included as a part of a continuous process of the type illustrated in FIG. 1, or it may be used in batch processing of eggs at points of consumption. When used as part of a continouos processing system for eggs, a loading device may be provided in combination with the peeler apparatus for loading eggs from a conveyor into one or more peeling devices stationed downstream from the cooking and cooling chambers discussed above. The loading device may be of any known construction and of a type for depositing one egg at a time into the type of peeler apparatus shown in FIGS. 4 and 5. Loading is synchronized with the peeling cycle so that a new egg is loaded into the apparatus upon completion of each peeling cycle.

The peeling apparatus includes a chamber means 20 which is sufficiently large to receive an egg and to allow rapid movements and changes in direction of the egg within the chamber. In the illustrated embodiment, the chamber means 20 is generally cylindrical in form with an open top, a side wall 22, and a closed bottom 24. The chamber means may be formed from stainless steel having a sand blasted interior surface. The type of cylindrical chamber means illustrated in FIGS. 4 and 5 can be approximately 5 inches in diameter and 3½ inches high when designed for receiving and peeling one egg at a time. The cylindrical chamber means 20 is supported on a rod 26 which extends through a central axis of the cylindrical chamber means. The rod 26 extends through the bottom 24 of the chamber means and is secured to two support arms 28 which are provided with known bearing structures at their points of securement to the rod 26. The bearing structures are designed to allow rotation of the rod 26 relative to the support arms 28. Spacer sleeves 30 and 32 are fitted over the smaller diameter rod 26 to fix the position of the chamber means 20 relative to the support arms 28. The rod 26 is provided with a threaded bottom end and a nut for assembling all parts together. The upper end of the rod 26 is secured with a flexible coupling 34 to a cross member 36 of a frame means 38 within which the chamber means is mounted. The flexible coupling means may comprise a pair of rubber sleeves joined together in the manner shown so that the upper end of the rod 26 can move by a limited amount relative to the frame means 38. As shown in FIG. 5, the lower end of the rod 26 is fixed by the support arms 28 so as to place the chamber means 20 in an offset position relative to a vertically disposed drive shaft means 40. The support arms 28 pass through openings in the drive shaft means 40 and are secured to the drive shaft means by the use of threaded lock nuts 42.

The vertical drive shaft means 40 is rotated about its vertical axis by a drive train (see FIG. 4) which includes a motor means 44, drive belt means 46, transmission means 48 for changing the direction of rotation, and a further drive belt means 50 which is connected to a drive pulley fixed to a lower extended end of the vertical drive shaft means 40. An additional drive belt 51 may be provided to drive an adjacent peeling unit, if desired. The vertical drive shaft means 40 is supported for rotation but prevented from moving axially relative to a base portion 52 of the frame means 38 by suitable bearing structures which are well known. With the arrangement which has been just described, it can be seen that a rotation of the drive shaft means 40 about its own axis causes the lower end of support rod 26 of the chamber means 20 to orbit about the axis of the drive shaft means 40. Thus, the chamber means itself is orbited about the position of the drive shaft means 40. However, this orbiting movement is accomplished without a rotation of the chamber means 20 within its own vertical axis (as defined by the position of the support rod 26) since the flexible coupling 34 prevents such rotation. As a result, the chamber means 20 is mounted and orbited in a tilted orientation which follows a cone-shaped path about the axis of rotation of the drive shaft means 40. The angle of the cone can be adjusted by moving the support arms 28 outwardly or inwardly relative to the drive shaft means 40 and by locking the support arms in adjusted positions. In the illustrated embodiment, the bottom of the pan is approximately 11 inches down from the point of connection between the flexible coupling means 34 and the upper end of support rod 26.

A further feature of the apparatus provides for a center sleeve 54 within the chamber 20, and the sleeve 54 may comprise a rubber sleeve fitted around the rod 26 so as to provide a center column within the chamber which forces an egg within the chamber to move more quickly into a centrifugal orbit. Also, it has been found that the use of a center column 54 permits a wider range of egg sizes to be peeled with a given adjustment of the apparatus.

To peel an egg in the apparatus, an egg is loaded into the chamber 20 when the chamber is in the generally upright position shown in FIGS. 4 and 5. Then, the drive shaft means 40 is rotated at a speed which is determined, in part, by the size and quality of the eggs being peeled. The angular tilt of the chamber (which can be defined as the amount of angular displacement of the inner surface of side wall 22 away from a vertical axis) is set by adjusting the support arms 28 prior to a peeling operation. Preferably, the angular tilt is about 5° – 15° when the chamber is viewed in the FIG. 5 orientation. Rotation of the drive shaft means 40 causes the chamber to orbit rapidly about the axis of the drive shaft means 40, and this subjects the egg to rapid rolling movements which change direction an infinite number of times during a peeling cycle. In addition, centrifugal and downwardly directed forces (ranging from about 2 to 7 pounds) are applied to the egg while it is moving about within the orbiting chamber 20, and the outside surfaces of the egg are rapidly flexed back and forth during the orbiting cycle. This flexing action takes place so rapidly that the bond between the shell membrane 14 and the cooked egg white is quickly broken and the shell is mechanically separated from the cooked egg. This peeling action takes place in a very short time, for example as short a time as 3 seconds.

When the peeling cycle is completed, the entire frame 38 is pivoted about an axis defined by mounting shafts 56 which carry the frame 38. The axes of the mounting shafts 56 are aligned with the input shaft of the transmission 48 so that there will be no disruption in the drive train during tilting of the frame 38. This pivoting movement can be effected manually or mechanically with a driven arrangement which tilts the entire frame 38 at the end of each peeling cycle. The purpose in tilting the frame 38 (see arrow in FIG. 5) is to carry the chamber means 20 mounted therein to a generally horizontal position in which the peeled egg and its shell can be discharged from the peeling chamber. A water injector 58 is mounted to the frame and directed towards the open top of the chamber means 20 so that water can be squirted into the chamber when it is moved downwardly to a discharging position. This washes out the chamber and removes the egg shell from the chamber along with a discharge of the cooked egg. A rack may be provided to receive the eggs and shells removed from the peeling apparatus, and the rack is designed so that eggs will roll over the rack to a collection point while the cracked and broken shells will pass through the rack to a separate collection point. After discharging the egg and shell from the chamber means 20, the frame 38 is brought back to the upright position shown in FIG. 5 for a subsequent peeling operation.

Although the peeling apparatus has been described with reference to a specific form of apparatus, it can be appreciated that eggs can be rapidly peeled with equivalent structures which produce the same forces and accomplish the same results. Generally, it is desirable to provide means for applying forces randomly to the surface of an egg, during rapid relative movements of the egg, so as to flex all surfaces of the egg and to produce numerous cracks and fractures in the shell. Equivalent structures can be designed from a study of some of the forces involved in the type of apparatus shown in FIGS. 4 and 5, as discussed below. Such equivalent structures include other forms of chambers and other means for rapidly flexing the shell of a cooked egg. For example, means in the form of rollers may be used for pinching and flexing the shell so as to cause a separation of the shell from the cooked egg white.

As the chamber orbits, as described above, a certain and constantly changing point on the circumferential wall of the chamber is the point farthest away from the axis of rotation. The egg in the chamber is in dynamic equilibrium only when it is as near this point as it can get. Since the theoretical point is constantly moving relative to the chamber (repeating once each revolution) the egg must keep moving in its attempt to get near that point. Since the chamber is tilted the egg is constantly pushed against both the sidewall and the bottom of the chamber by centrifugal force and is squeezed into a "continuous corner" formed by their intersection. In addition, due to the roughened interior surface of the chamber and the non-spherical shape of the egg, the egg rolls in a bumpy sort of way around the periphery of the cylindrical wall of the chamber while being squeezed and pinched into the "continuous corner."

The following parameters on the apparatus are adjustable:
1. The speed of "orbiting" about the axis of rotation in RPM = $N$.
2. The number of orbits made about the axis of rotation per peeling cycle = $n$.
3. The distance of the center of gravity of the egg from the axis of rotation = $r$.
4. The weight of the egg = $W$.
5. The amount of tilt of the cylindrical chamber from the vertical = $\phi$.

These combine to yield:
The force of the egg against the sidewall of the chamber = $F_S$.
The force of the egg against the bottom of the chamber = $F_B$.

Empirically it has been determined that a proper combination of variables can be achieved to peel a sufficient number of any size (medium for example) eggs to make the process economically attractive. Therefore there must be some $F_S$ and $F_B$ which is great enough to loosen the shell and membranes from the white without disturbing the yolk. It has also been shown that if the yolk is located too near the edge of the white, it can be separated from the white by a force which is lower than that required to separate the shell and membranes from the white. Therefore, it is important in mechanical peeling to observe the method discussed above for locating the yolk near the center of the white.

The variable $n$ does not directly affect the magnitude of $F_S$ and $F_B$. If these forces are optimized by the adjustment of other variables, it has been found that 10 to 20 orbits per peeling cycle are sufficient. If $F_S$ and $F_B$ are low, a considerably greater number of orbits is required for peeling. Considering the details of the apparatus used, the quality of the eggs generally available, and the most economic time cycle under these conditions, it has been determined that a preferred range of 10 to 20 orbits is preferred.

With respect to the tilt angle $\phi$ of the cyclindrical chamber, it has been found that angles between 10° and 17° work approximately equally well. On the other hand, a tilt angle of 0° does not work well at all. Apparently the importance of the exact angle is not great as long as the inner sidewall of the chamber is not nearer to the vertical than 5° to 10°.

Looking at the dynamics of the operation, the acceleration (normal to the axis of rotation) required to maintain the velocity of eggs in a circular path is:
$a = V^2/r$ where $V$ = velocity of an egg.
$F = Ma$ (Newton's Law) when $M$ = mass of egg.
$F = MV^2/r$ when $F$ = centrifugal force normal to axis of rotation.
$M = W/g$ where $g$ on earth = 32.2 feet/sec./sec.
$F = W/g \, V^2/r$.

The velocity of the egg's center of gravity must be the circumference of the circle it generates as it moves, times the number of circles generated per unit time (seconds is a convenient unit here) or:

$$V = 2\pi rN/60$$

substituting again $F = W/g(2\pi rN/60)^2/r$.
Now, inserting the constants to get $W$ to ounces, $r$ to inches, and $F$ to pounds:
$F = (1.773 \times 10^{-6})WrN^2$ where $F$ is normal to the axis of rotation.
Accounting now for the effect of the tilt angle $\phi$
$F_S = F \cos \phi$ and $F_B = F \sin \phi$
The following settings were empirically determined for medium eggs (weight 1.75 to 2.0 ounces):
$W = 2.0$, $N = 570$ RPM, $r = 3.5$ inches
$F = (1.773 \times 10^{-6})(2.0)(3.5)(570)^2 = 4.03$ lbs.
At a tilt angle of $\phi = 15°$
$F_S = 4.03 (0.97) = 3.91$ lbs. $F_B = 4.03 (0.26) = 1.05$ lbs.

Neglecting the fact that small eggs have thicker shells than large eggs, we can determine an $r$ for each weight size of eggs so that $F$ will be the same for any size egg. In actual practice, the $F$ used for small eggs will be larger than for large eggs. The range of egg sizes that can be peeled at one adjustment setting of the peeling apparatus will depend on the tolerance to $F$ built into the cooked egg through egg quality, cooking, cooling, etc. The range of usable forces ($F$) seems to be from about 2 lbs. to 7 lbs.

It can be seen therefore that the application of a certain range of forces in a certain way is what peels the egg. This specification describes one type of apparatus for creating these forces, but other ways will be obvious to those skilled in the art.

I claim:
1. A method for cooking and peeling poultry eggs comprising the steps of:
    orienting the eggs so that their small ends are directed downwardly on substantially vertical axes so as to center yolk portions of said eggs within their shells,
    cooking the eggs in this oriented position in a fluid medium at an elevated temperature for a sufficient time to hard cook the eggs, rapidly cooling at least the outside surfaces of the eggs to facilitate peeling, and peeling the eggs to remove the shells therefrom by subjecting the surface of each egg to repeated flexing to break the bond between the egg shell membrane and the egg white without disrupting the integrity of the egg white and its contained yolk by placing the eggs in a substantially cylindrical chamber having its central axis generally disposed at an angle to the vertical and moving the chamber in an orbital movement without rotating the chamber about its central axis, thereby subjecting the eggs to rapid rotational movement against the chamber walls and to a corner squeezing and/or pinching action to release the membrane and the shell from the egg white, thereby peeling the eggs.

2. The method of claim 1 wherein said cooking step is carried out at a temperature range of about 200° to 212° F with water as the fluid medium and for a period of at least 18 to 22 minutes.

3. The method of claim 1 and including a step of packaging the eggs after the step of peeling.

4. The method of claim 1 including the additional step of pasteurizing the eggs by reheating by radio frequency energy to a temperature of at least 180°F.

5. The method of claim 1 wherein said cooling step comprises a step of immersing the eggs into a relatively cold fluid medium which is at a temperature of about 32° to 35° F.

6. The method of claim 5 wherein said fluid medium for cooling comprises water.

7. The method of claim 1 wherein said central axis of said chamber describes a conical surface during said orbital movement.

8. The method of claim 7 wherein the eggs are rapidly cooled by chilling with a cooling medium at a temperature at least as low as 32°–35°F.

9. The method of claim 1, including the additional step of pasteurizing the eggs after peeling.

10. The method of claim 9 wherein only the outside surfaces of the eggs are cooled, with the centers of the eggs maintained at relatively high temperatures, and the pasteurization is by reheating the eggs after peeling and while the centers of the eggs are at a relatively higher temperature than the outside surfaces thereof.

11. The method of claim 10 wherein said step of reheating is carried out after said step of packaging.

12. The method of claim 11 wherein said step of reheating comprises treating the packaged eggs with radio frequency energy.

13. The method of claim 10 wherein said step of reheating is carried out before said step of packaging.

14. The method of claim 13 wherein said step of reheating comprises treating the eggs with radio frequency energy.

* * * * *

UNITED STATES PATENT OFFICE
CERTIFICATE OF CORRECTION

Patent No. 3,764,714                    Dated   October 9, 1973

Inventor(s)  Leslie W. Driggs

It is certified that error appears in the above-identified patent and that said Letters Patent are hereby corrected as shown below:

The assignee if reflected as being "Nutronics". This should read "Nutrionics".

Col. 1, line 55, "im" should be "in".

Col. 2, line 38, "prevent" should be "present".

Signed and Sealed this thirtieth Day of September 1975

[SEAL]

Attest:

RUTH C. MASON
Attesting Officer

C. MARSHALL DANN
Commissioner of Patents and Trademarks